S. JOHNSTON, DEC'D.
A. E. NEAR, EXECUTOR.
AUTO JACK.
APPLICATION FILED SEPT. 8, 1919.
1,383,545.
Patented July 5, 1921.
2 SHEETS—SHEET 1.
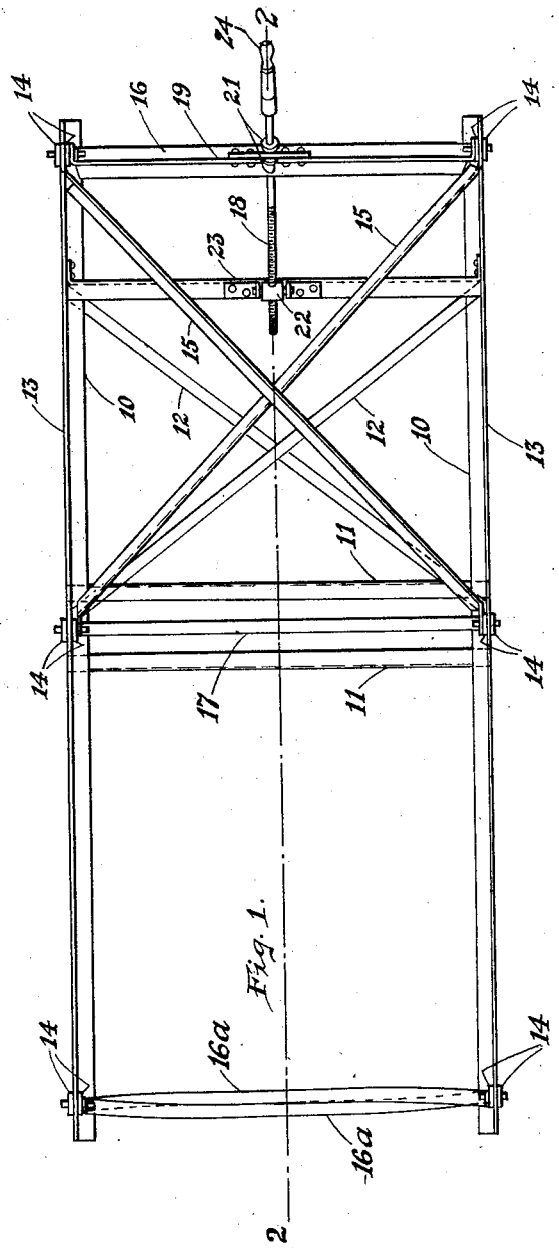
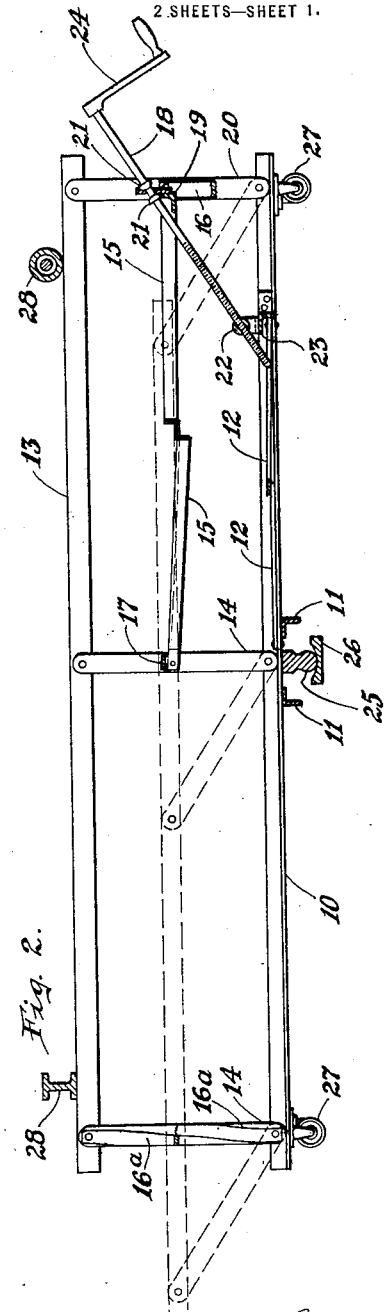

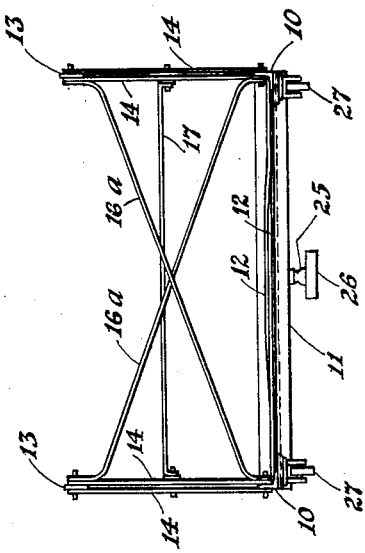
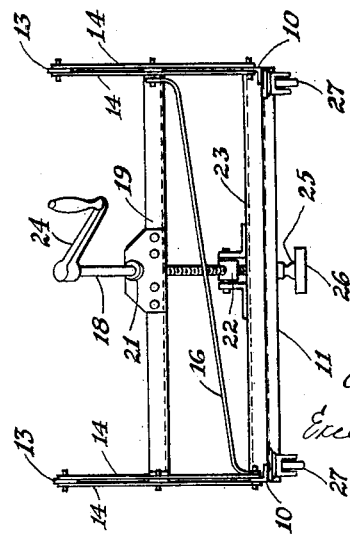

UNITED STATES PATENT OFFICE.

SAMUEL JOHNSTON, DECEASED, LATE OF PORT COLBORNE, ONTARIO, CANADA, BY ALBERT E. NEAR, EXECUTOR, OF PORT COLBORNE, CANADA, ASSIGNOR, BY DIRECT AND MESNE ASSIGNMENTS, OF ONE-HALF TO LOUIS G. BROWN, OF NIAGARA FALLS, NEW YORK, AND ONE-HALF TO SALATHIEL JOHNSTON, OF BERTIE TOWNSHIP, ONTARIO, CANADA.

AUTO-JACK.

1,383,545.  Specification of Letters Patent.  Patented July 5, 1921.

Application filed September 8, 1919. Serial No. 322,481.

*To all whom it may concern:*

Be it known that SAMUEL JOHNSTON, deceased, late of Port Colborne, in the Province of Ontario and Dominion of Canada, formerly of Bridgeburg, Ontario, Canada, did invent certain new and useful Improvements in Auto-Jacks, and the following is hereby declared to be a full, clear, and exact description of the same, reference being had to the accompanying drawings, forming a part of this specification, and to the reference characters marked thereon.

This invention relates to an auto-jack or elevating device for lifting an automobile or similar vehicle from the floor or ground in order to relieve the tires from the weight of the car when in the garage, thereby saving the tires and increasing their durability. The device may also be used for lifting a car in repairing tires or other parts.

The chief object of the invention is the provision of a strong, durable and inexpensive auto-jack of this character which can be operated with comparative ease.

A further object is to so construct the device that it may also be used as a turn table, if desired.

In the accompanying drawings:

Figure 1 is a top plan view of the auto-jack. Fig. 2 is a longitudinal section on line 2—2, Fig. 1. Fig. 3 is a front view of the device. Fig. 4 is a rear view thereof.

Similar characters of reference indicate corresponding parts throughout the several views.

The jack has an oblong base or base-frame about as long as the wheel base of the vehicle to be elevated and sufficiently narrow to enter between the wheels lengthwise of the car. In its preferred construction, this frame is composed of a pair of parallel side bars or members 10, 10 of angle iron, transverse tie bars or members 11 arranged near the central portion of the frame and intersecting or diagonal braces 12, the latter and said tie-bars being firmly secured to the side bars to form a strong and rigid base-frame.

Arranged above this relatively-stationary base frame is a vertically movable lifting-frame composed of longitudinal or side bars 13 respectively arranged in line with the corresponding bars of the base frame and connected therewith by parallel vertically-swinging links 14, movable lengthwise of the frame. In the construction shown in the drawings, these lifting bars are flat and set on edge and they are co-extensive with the side bars of the base-frame. This vertically-movable frame is suitably braced or stiffened. In the example shown, it is tied together by intersecting horizontal braces 15 pivotally connected at their ends to opposing pairs of links 14. At one end, said lifting frame is stiffened by an inclined transverse brace 16 pivoted at one end to one side bar of the base-frame and at its other end to the adjacent end link at the opposite side of the jack. At the other end of the jack, the lifting frame is stiffened by two intersecting inclined braces 16$^a$ pivoted at their lower ends to the side bars of the base-frame and at their upper ends to the corresponding two end links, respectively. The two middle links are stiffened by a transverse tie bar 17.

The lifting frame, as well as the base-frame may, however, be braced in any other appropriate manner and constructed of wood or other suitable material.

Any suitable means may be employed for actuating the links to raise or lower the lifting-frame. The device preferred for this purpose, consists of an inclined longitudinal screw-shaft 18 arranged centrally of the apparatus and journaled near its upper front end in a cross bar 19 pivotally connected at its ends to the two front links 14 about midway of their length. This shaft is held against longitudinal movement in said cross bar by collars or shoulders 21, and its opposite threaded end engages a nut 22 which is swiveled to a cross bar 23 secured to the side bars of the base-frame. This shaft is provided at its front end with a crank 24 or other means for conveniently turning it.

In the construction shown, the links are double or composed of a pair of parallel bars arranged on opposite sides of the longitudinal upper and lower bars 10, 13, but links composed of single bars or members may obviously be substituted for them.

In the use of the auto-jack, the lifting-frame is lowered below the level of the axles of the car to be lifted, and the car is then run over the jack, with the side bars of the base-frame and lifting-frame between its wheels. The lifting frame is then raised by turning the screw shaft in the proper direction, thus elevating the car bodily and lifting its four wheels simultaneously off the floor or ground. The tires are thereby relieved from the weight of the car protecting them from strain and wear while the car is in the garage. The lifting frame is retained in its elevated position by the screw shaft and nut without the use of any additional holding or locking device, thus simplifying the construction of the jack and facilitating its operation.

While primarily intended for lifting the car off the ground to save the tires, the device also serves as a lifting jack for removing and replacing tires and for making repairs of various kinds.

If the device is to be used only as an auto-jack, its base-frame is immovably supported on the floor or ground. If desired, however, the device may also be constructed in the form of a turn table, as shown in the drawings. In this case, the base frame is made rotatable, the same being provided centrally with a supporting pivot 25 preferably in the form of a ball seated in a socket or concave plate 26 fastened to the floor. The ends of the base-frame are supported by casters 27 of any suitable construction located at its corners. By this construction, the auto-jack can be rotated bodily to turn a car supported thereon.

It will be understood that when the car is elevated, its front and rear axles 28 rest upon the longitudinal bars 13 of the lifting frame, the axle being shown in Fig. 2.

The claims of the invention are:

1. An auto-jack, comprising a base-frame, a vertically-movable lifting-frame arranged above the same, links connecting said frames and movable lengthwise thereof, a nut swiveled upon the base-frame to rock in a vertical plane, a cross bar connecting an opposing pair of said links, and an actuating screw journaled in said cross bar but held against longitudinal movement therein, said screw engaging said nut.

2. An auto-jack comprising a base-frame having longitudinal side bars connected by transverse tie bars, a swiveling nut mounted on one of said tie bars, a lifting frame comprising longitudinal side bars arranged above the side bars of the base-frame, links connecting said upper and lower side bars, a transverse bar connecting an opposing pair of said links at one end of the auto-jack, an actuating screw journaled in the last-named bar and engaging said nut, and inclined transverse braces arranged at the other end of the jack and each extending from one of the side bars of the base-frame to the opposite side-bar of the lifting frame.

ALBERT E. NEAR,
*Executor of will of Samuel Johnston, deceased.*